252-589 $$$ SR CROSS REFERENCE SEARCH ROOM
MTR34 XR T 866,030

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1438

T 866,030

~~732,043~~

COATING COMPOSITIONS AND COATED SUBSTRATES

Larry G. Curtis, 3606 Cimarron Drive, Johnson City, Tenn. 37601, and Roy G. Foulk, 1357 Garden Drive, Gerald R. Lappin, 4047 Skyland Drive, Jack W. Lowe, Jr., 520 Rambling Road, and Wayne V. McConnell, 1509 Ardmore Place, all of Kingsport, Tenn. 37664

Filed May 27, 1968. Published Sept. 30, 1969
Int. Cl. C08f *15/18;* C09d *5/32, 3/80*
U.S. Cl. 117—33.3
No Drawing. 12 Pages Specification

Coating compositions, coated substrates, and coating process are disclosed which provide improved stability with respect to degradative effects of ultraviolet light. The coating composition comprises a film-forming material which includes a polymer of methyl methacrylate, a polymeric ultraviolet light inhibitor, and a volatile solvent therefor. The polymers of methyl methacrylate include homopolymers of methyl methacrylate, copolymers of methyl methacrylate and a minor proportion of other copolymerizable materials, or mixtures of the homopolymers and copolymers. The polymeric ultraviolet light inhibitors according to this invention are defined as copolymers of (I) 4-benzoyl-3-hydroxyphenoxyethyl acrylate or methacrylate with (II) an alkyl acrylate or methacrylate wherein the alkyl group has 4–18 carbon atoms. The volatile solvents according to this invention include aliphatic, cycloaliphatic and aromatic hydrocarbons, esters, ethers, ketones and alcohols. The coating process includes applying the above-described coating composition to a substrate and baking it at about 150–225° F. to volatilize the solvent, sanding the coated substrate to remove surface imperfections, and again baking at about 275–325° F. to soften and reflow the coating.